United States Patent [19]

Peters et al.

[11] Patent Number: 4,803,400

[45] Date of Patent: Feb. 7, 1989

[54] PRE-WATER-BASED SUSPENSION PHOSPHOR TREATMENT PROCESS

[75] Inventors: Thomas E. Peters, Chelmsford; Roger B. Hunt, Jr., Medfield, both of Mass.

[73] Assignee: GTE Laboratories Incorporated, Waltham, Mass.

[21] Appl. No.: 10,078

[22] Filed: Feb. 2, 1987

[51] Int. Cl.$^4$ ............................................. H01J 63/04
[52] U.S. Cl. ..................................... 313/489; 427/67; 427/215; 313/485
[58] Field of Search .................... 427/213, 215, 67, 64, 427/374.1; 313/485, 487, 489, 486

[56] References Cited

U.S. PATENT DOCUMENTS

| | | | |
|---|---|---|---|
| 3,249,788 | 5/1966 | Wainio et al. | 313/491 |
| 3,310,418 | 3/1967 | Friedman et al. | 427/67 |
| 3,833,398 | 9/1974 | Schreurs | 252/301.4 S X |
| 4,396,863 | 8/1983 | Ranby et al. | 313/486 |
| 4,585,673 | 4/1986 | Sigai | 427/213 |

Primary Examiner—David K. Moore
Assistant Examiner—Michael Horabik
Attorney, Agent, or Firm—Ivan L. Ericson

[57] ABSTRACT

A method for eliminating carbonaceous contaminants and preventing the hydration/solubilization of the oxide coating of a phosphor is described. The method involves the annealing of the oxide coated phosphor at a temperature and for a period sufficient to preclude adversely affecting the protective oxide coating on the phosphor during subsequent water-based suspension processing without detrimentally altering the phosphor. After annealing the phosphor is cooled and then added to a water-based suspension. The optimum conditions for annealing a manganese activated zinc silicate phosphor or a calcium halophosphate phosphor having a protective aluminum oxide coating are the combination of a temperature between about 700° C. and about 850° C. and for a period of time from about 15 minutes to about 20 hours.

11 Claims, 2 Drawing Sheets

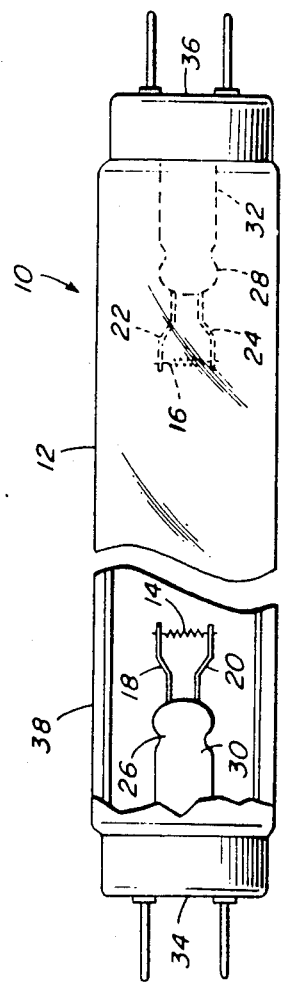

PRE-WATER-BASED SUSPENSION PHOSPHOR TREATMENT PROCESS

FIELD OF THE INVENTION

This invention relates to a method of treating a phosphor. More particularly, this invention relates to a method of treating a phosphor having a protective coating.

BACKGROUND OF THE INVENTION

State-of-the-art, in the fabrication of fluorescent lamps, a phosphor layer is coated on the interior surface of a glass lamp envelope using a paint-like suspension of phosphor powder. Although the composition of the suspension varies from manufacturer-to-manufacturer, the composition usually includes, in addition to the phosphor, a film forming binder, solvent(s) for the binder, and if necessary surfactants, defoamers and wetting agents. Most non-phosphor components of the coating suspension interfere with efficient lamp operation and longevity, and must be removed by pyrolysis in a manufacturing step known as "lehring". Another inorganic, non-fluorescent, component of the coating suspension is a submicron particle sized material, such as silicic acid or alumina, which helps bind the phosphor to the glass after the "lehr" process has removed the organics. Butler in his book, *Fluorescent Lamp Phosphors, Technology and Theory*, Penn State University Press (1980), gives a rather complete description of lamp coating technology and its evolution from the nitrocellulose and ethlycellulose-type lacquers to the newer polymeric binders that employ water as the solvent in place of the environmentally objectionable and flammable organic compounds. Depending on the chemical composition of the phosphor and method of preparation, phosphors may exhibit some differences in performance depending on whether they are deposited from organic-based suspension or from water-based suspension systems. Usually these differences are not significant unless the phosphor has a tendency to react chemically with one of the suspension components.

A variety of technologies have been described recently, i.e., U.S. Pat. No. 4,585,673, that permit the coating of phosphor particles with a thin film of a refractory oxide. This film can be made from a choice of different refractory oxides. Some of these, particularly $Al_2O_3$ and $Y_2O_3$, have been found effective in protecting the phosphor against processes that cause lumen depreciation in fluorescent lamps. One example of such a protective coating, is that described in U.S. Pat. No. 4,585,673, in which the phosphor particles were coated with $Al_2O_3$ by pyrolizing an aluminum alkyl in a fluidized bed of phosphor powder. Experimental fluorescent lamps employing such coated phosphors, particularly those using $Zn_2SiO_4$:Mn (Willemite) have shown significant improvements in lumen maintenance relative to lamps employing uncoated phosphors. Lamp test data also indicate that $Al_2O_3$ coated $Zn_2SiO_4$:Mn phosphors (ACPs) perform equally well with regard to luminance and lumen maintenance when applied to the lamp envelope from freshly prepared organic or water-based suspensions. If, however, the ACP is applied from a water-based suspension that has been held-over for several days before use, the beneficial effects associated with the oxide coating are lost. This presents a serious obstacle to the commercialization of lamps based on the coated phosphor technology. Government regulations have already eliminated the use of organic-based phosphor suspensions in many parts of the world, and reintroduction and/or expansion of this old technology is therefore not a viable option. Moreover, the use of only freshly prepared water-based phosphor suspensions is precluded by the short useful life of these suspensions and by the cost of dumping the large volumes of aged material that would be generated in a modern automated lamp manufacturing facility. Therefore, it is desirous to provide a method which will improve the useful life of water-based phosphor suspension which presently have poor hold-over characteristics.

SUMMARY OF THE INVENTION

In accordance with one aspect of the present invention, a new and improved method for the pre-water-based suspension treatment of a phosphor comprises the following steps:

Step 1—A phosphor having a protective coating is annealed at a temperature and for a period sufficient to preclude adversely affecting the protective coating on the phosphor during subsequent water-based suspension processing and to preclude detrimentally altering the phosphor.

Step 2—The product from step 1 is cooled.

Step 3—The product from step 2 is added to a water-based suspension.

BRIEF DESCRIPTION OF THE DRAWINGS

In the drawing:

FIG. 3 is a view of a fluorescent lamp, partially in section, diagrammatically illustrating an embodiment of the invention.

For a better understanding of the present invention, together with other and further objects, advantages and capabilities thereof, reference is made to the following disclosure and appended claims in connection with the above-described drawings.

DETAILED DESCRIPTION OF THE INVENTION

Our Invention

We have investigated the degradation of $Al_2O_3$ coated $Zn_2SiO_4$:Mn phosphors (ACPs), a coated willemite, in water as a function of the hold-over time, the time the water-based suspension is stored before it is used to coat a lamp. We also investigated a water-based suspension that uses polyethylene-oxide (Polyox—a product of Union Carbide Corp.) as the binder. In evaluating the hold-over problem with coated willemite, manganese activated zinc silicate phosphor, we have noticed that the Polyox coating solution is noticeably thicker (more viscous) after being held-over, than when it is fresh. When the held over coated phosphor suspension is coated on a glass slide (a thick coating) and is dried, the coating develops cracks. This cracking of the phosphor layer occurs only when the alumina coating is no longer providing protection for the phosphor. In other words, a suspension of a fresh alumina coated phosphor, or an uncoated phosphor doesn't exhibit cracking, while the held-over suspension of an alumina coated phosphor does produce cracked coatings. While not wishing to be bound by theory, it is believed that the alumina coating comes off the phosphor and becomes a component of the suspension media and thereby causes a cracked phosphor layer.

Typically, during the investigation, suspensions of ACP were prepared and kept continuously agitated for periods of up to two months, with aliquots removed periodically for lamp tests. In the preliminary tests, the suspensions of ACP were coated on glass slides and evaluated in a demountable fluorescent lamp of approximate T-12 bore, operated at approximately 400 mA, and at an argon pressure from about 2–3 Torr. The intensity of light emitted by the phosphor deposited from the freshly prepared coating suspension remains almost constant for the duration of the test while that from the phosphor deposited from the aged suspension, held over suspension, begins to drop from the instant the lamp is turned on. It was this almost catastrophic drop in lumen maintenance that made the demountable lamp an ideal vehicle in which to test suspensions of ACP which were held-over while minimizing both the time and quantity of material required for each evaluation. The results obtained from demountable lamp tests were confirmed, when necessary, by more extensive testing in regular 40W T-12 type fluorescent lamps.

Figure 1:
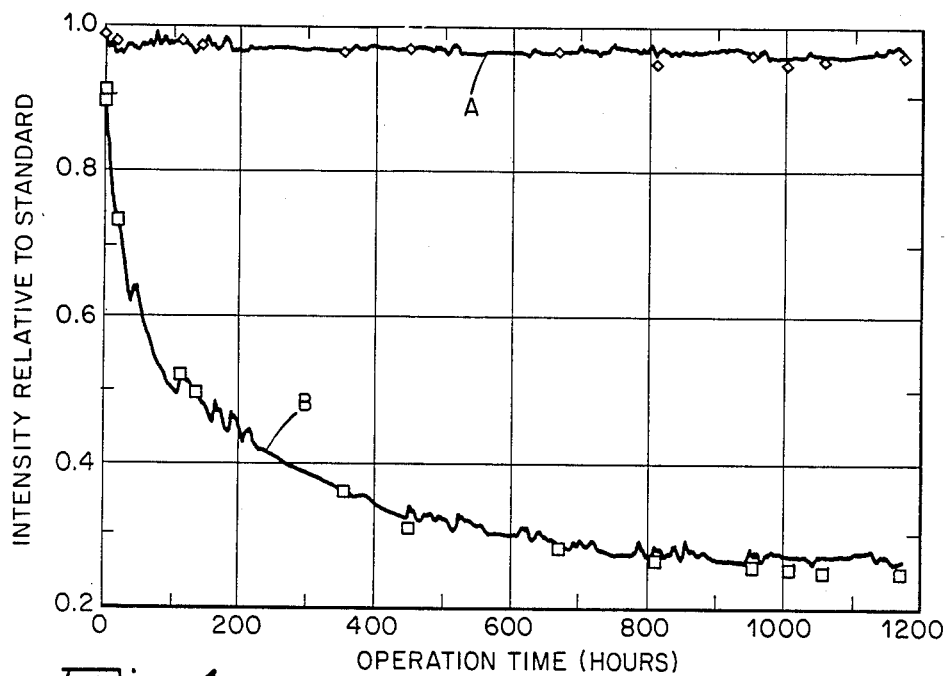
FIG. 1 is a plot of the intensity of light emitted by a phosphor made in accordance with the present invention as a function of the time of lamp operation.

In FIG. 1, curve A depicts the intensity of light emitted relative to a standard by a phosphor layer as a function of the time in hours of the demountable lamp operation in which the phosphor layer was made from an alumina coated manganese activated zinc silicate phosphor, annealed at 750° C. for 4 hours prior to the water-based suspension processing. Curve B in FIG. 1 depicts the intensity of light emitted to a standard by a phosphor layer as a function of the time in hours of the demountable lamp operation in which the phosphor layer was made from an alumina coated manganese activated zinc silicate phosphor which was not annealed prior to the water-based suspension processing. As curve B indicates there was a dramatic decrease in the light intensity emitted relative to the standard as a function of a demountable lamp operation time. In both curves, A and B, the water-based suspensions used to coat the test slides in the demountable lamp were held-over for 26 days. The standard was another phosphor layer made from a non-annealed alumina coated manganese activated zinc silicate phosphor. The water-based suspension of the standard was not held over, it was a fresh suspension. In other words, the suspension was used to coat the slide in the demountable lamp as soon as the suspension was prepared.

Tests revealed that while some of the components of the water-based suspension hasten and/or promote ACP degradation, water is the principal agent in the destruction of the $Al_2O_3$ coating and subsequent loss of the high lumen maintenance the protective alumina coating afforded. The solution to the problem was to modify the oxide coating so that it is not readily attacked by water.

Oxide Coating Modification

Most phosphor overcoating techniques employ organo-metallic compounds that can be hydrolized, pyrolized, oxidized, or other ways to thermally or chemically yield an oxide film. Virtually all of these oxide forming processes are carried out at low temperatures, around 500° C., that produce, what we refer to as, a "soft" oxide. While not wishing to be bound by theory we believe that this "soft" oxide is likely to be amorphous rather than crystalline, might contain water or be prone to hydration/solubilization, and would probably contain significant quantities of carbonaceous products. To "harden" the oxide, we used a thermal annealing process. We envisioned that the annealing would crystallize and densify the oxide and thereby make it less prone to degradation in hydrous environments. It was hypothesized that the annealing should be carried out under conditions that would promote crystallization of the alumina coating and at the same time not significantly encourage diffusion processes that might alter phosphor performance. In other words, it would be desirable to keep the annealing temperature as low as possible and the annealing time as short as possible. Methods found suitable for annealing alumina coated $Zn_2SiO_4$:Mn (ACP), are set forth in Examples #1 and #2.

EXAMPLE #1

Quantities of an $Al_2O_3$ coated $Zn_2SiO_4$:Mn phosphor (ACP) ranging from 0.3 to 1.0 Kg were placed in quartz boats measuring 6"×3"×2.5" and annealed in a box furnace. A microprocesser was used to slowly heat the furnace to a temperature ranging from about 700° C. to about 950° C. over a period of about one hour. Annealing times, not including the heat-up period, ranged from about 1 to about 14 hrs. Upon completion of the anneal cycle, the boats were removed from the furnace and allowed to cool to room temperature on a heat resistant counter top. Phosphors treated in this way were then evaluated in fluorescent lamps. Tests were conducted using 40W T-12 fluorescent lamps coated with fresh and aged (5 day hold-over) water-based suspensions of the annealed ACP. The water-based suspension medium comprises a binder such as polyethylene oxide (POLYOX a product of Union Carbide Corp.), minor amounts of other ingredients such as finely-divided aluminum oxide particles, and water. Results of these tests are presented in Table 1.

TABLE 1

| Results of ACP Holdover Tests in 40 W T-12 Lamps | | | | | | |
|---|---|---|---|---|---|---|
| | | No Holdover | | | 5 Day Holdover | |
| Sample | Anneal, °C./Hrs | 0 Hour Lumens | 100 Hour Lumens | % M | 0 Hour Lumens | 100 Hour Lumens | % M |
| ACP #1 | None | 3970 | 3199 | 80.6 | 4533 | 2348 | 51.8 |
| | 850/4 | 4504 | 4062 | 90.2 | 4530 | 4137 | 91.3 |
| ACP #2 | None | 4462 | 4231 | 94.8 | 4680 | 3073 | 65.7 |
| | 850/2 | 4755 | 4372 | 91.9 | 4718 | 4373 | 92.7 |
| ACP #3 | None | 4656 | 4191 | 90.0 | 4728 | 2966 | 62.7 |
| | 850/2 | 4734 | 4388 | 92.7 | 4737 | 4362 | 92.1 |

Referring to Table 1, a comparison of the 0 hour lumen values for lamps containing unannealed ACP shows that the luminance of lamps prepared from held-over suspensions exceeds that of the lamps prepared from fresh suspensions. This can be viewed as a recapturing of the luminance exhibited by the phosphor in the uncoated or virgin state and indicates that the alumina coat is being stripped from the phosphor during holdover. The loss of the protective alumina coating is also reflected in the lower 0–100 hr percent maintenance (% M) values recorded for the lamps coated with held-over suspensions of ACP. On the other hand, the 0–100 hr % M for lamps containing the annealed ACP changes very little when the water-based suspension was held over indicating that the protective alumina coating has remained in place. It can also be seen that lamps prepared from fresh suspensions of annealed ACP exhibit higher luminance than their unannealed counterparts. This, we believe, can be attributed to the pyrolysis of carbonaceous materials trapped in the previously discussed "soft" oxide coating; however, we do not wish to be bound by any such theory.

EXAMPLE #2

From a single batch of alumina coated $Zn_2SiO_4$:Mn (ACP), 22 annealing conditions were tested to determine the time/temperature relations required to eliminate hold-over degradation. The annealing was performed with 15 gram samples in flowing air in a tube furnace. The samples were stoked into a hot furnace and were withdrawn to cool outside the furnace when the desired anneal time was completed.

The annealed phosphor was subsequently held-over in a water-based suspension by tumbling in water in sealed vials for ten days. The minimum times and temperatures required to eliminate the hold-over problem are as follows:

| | |
|---|---|
| 850° C. | 15 minutes |
| 800° C. | 30 minutes |
| 750° C. | 4 hours |
| 700° C. | 20 hours(est'd) |

Times or temperatures less than these values will result in stepwise decreases in the 0–100 hr maintenance values on hold-over evaluation. For example, 2 hrs @ 750° will give 85% M vs 95% M for 4 hrs @ 750° C.

Figure 2:
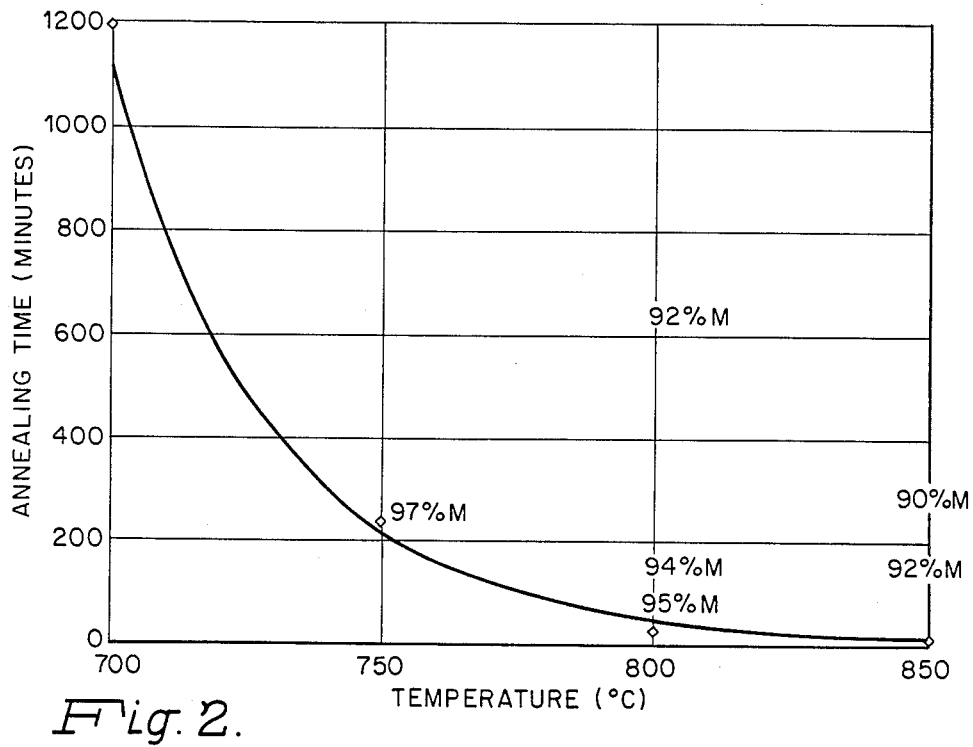
FIG. 2 is a plot of the locus of the annealing time-temperature relationships required to eliminate the hold-over degredation of the coated phosphor in accordance with the present invention.

FIG. 2 is a plot of the "hold-over locus" of the results obtained from the tests described above. Included in this plot are 0–100 hr % M values obtained from lamps containing fresh (not held-over) annealed ACP, showing that samples annealed beyond the required minimum time (above the curve) exhibit increasingly poor maintenance. Based on XPS, X-ray Photoelectron Spectroscopy, analysis, we tentatively attribute this to zinc diffusing through the oxide coating. We have settled on 4 hrs @ 750° C. as optimal annealing for large batches of ACP.

EXAMPLE #3

From a single batch of a antimony, manganese activated calcium halophosphate phosphor, such as a Cool White fluorescent lamp phosphor, we prepared four samples.

Sample #1 was an uncoated Cool White phosphor processed through a water-based suspension process, the fresh, not held over, suspension was coated in 48T12 VHO fluorescent lamps. The coated lamps were "lehred" and further processed into finished lamps. These lamps were then placed on life test as the control for the test.

Sample #2 was an alumina coated Cool White phosphor which was annealed at 750° C. for 4 hours before being processed though a water-based suspension process. The resulting suspension was held for a week before the suspension was coated in 48T12 VHO fluorescent lamps. The coated lamps were "lehred" and further processed into finished lamps. These lamps were then placed on life test with the control lamps.

Sample #3 was an alumina coated Cool White phosphor which was annealed at 850° C. for one hour before being processed though a water-based suspension process. The resulting suspension was held for a week before the suspension was coated in 48T12 VHO fluorescent lamps. The coated lamps were "lehred" and further processed into finished lamps. These lamps were then placed on life test along with sample #2 lamps and the control lamps.

Sample #4 was an alumina coated Cool White phosphor which was not annealed before being processed though a water-based suspension process. The resulting suspension was held for a week before the suspension was coated in 48T12 VHO fluorescent lamps. The coated lamps were "lehred" and further processed into finished lamps. These lamps were then placed on life test along with sample #2 lamps, sample #3 lamps, and the control lamps.

The results of the 100 hour life test are found in Table 2.

TABLE 2

| | Results of 100 hr. Cool White Lamp Life Tests | | | |
|---|---|---|---|---|
| Sample no. | 0 hr. Lumens | 100 hr. Lumens | Optical Density | % M |
| #1 | 7260 | 6985 | 76.5 | 96.2 |
| #2 | 7328 | 7116 | 76.9 | 97.1 |
| #3 | 7208 | 7079 | 76.4 | 98.2 |
| #4 | 6266 | 6684 | *80.5 | — |

*indication that the protective alumina coating came off during the hold over period of one week of the water-based suspension.

As Table 2 indicates the lamps made from samples #2 and #3 were better than lamps made from sample #1, the control, and sample #4 (the coated phosphor not annealed).

The fluorescent lamps used in the above Cool White tests and which can be used for the manganese activated zinc silicate phosphors as well have the structure as shown, for example, in U.S. Pat. Nos. 3,424,605; 3,424,606; 3,435,271; or 4,594,178; the FIGS. of which, and the portions of the specification corresponding thereto, are incorporated herein by reference to the extent necessary to complete this speification. Such fluorescent lamps consist of a hermetically sealed tubular glass envelope coated on its inside surface with powdered phosphor coating in accordance with the present invention, which converts the ultra-violet energy of a mercury arc discharge established through the center of the tube into visible light as it is absorbed by the phosphor layer during operation of the lamp. The bases at each end of the tubular envelope support electrical leads which are electrically connected to electrodes at each end of the lamp. The spaced electrodes can be coated with electron-emission promoting materials, such as mixtures of oxides containing a barium oxide, to facilitate operation of the lamp. During operation, a mercury droplet maintained within the sealed envelope is vaporized thereby causing the characteristic mercury discharge. Except for the nature of the phosphor coating, which is the subject of the present invention, construction of the fluorescent lamp is conventional.

There is shown in FIG. 3 a fluorescent lamp 10. lamp 10 comprises an elongated sealed glass envelope 12 of circular cross section. It has the usual electrodes 14 and 16 at each end supported by lead-in wires 18, 20 and 22, 25, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of evelope 12 is coated with a layer of phosphor 38 of the present invention.

A phosphor coating suspension was prepared by dispersing the phosphor particles in a water base system employing polyethylene oxide as the binder with water as the solvent.

The phosphor suspension was applied in the usual manner of causing the suspension to flow down the inner surface of envelope 12 and allowing the water to evaporate leaving the binder and phosphor particles adhered to the envelope 12 wall. The phosphor coated envelope 12 was then heated in a lehr oven to volatilize the organic components, the phosphor layer 38 remaining on the envelope 12 wall.

Envelope 12 is processed into a fluorescent lamp by conventional lamp manufacturing techniques.

We have identified and evaluated a method of preserving the oxide coating on phosphors during holdover in water-based suspensions. The thermal annealing process we believe "hardens" the coating and eliminates its carbonaceous contaminants, prevents the hydration/solubilization of the oxide and extends, indefinitely, the useful life of the water-based suspensions of the coated phosphors.

The thermal annealing process should be carried out for a sufficient period of time and at a temperature high enough to "harden" the oxide coating while not detrimentally altering phosphor performance. Because chemical reactivity and diffusion are materials sensitive processes, the optimum annealing temperature-time conditions must be determined experimentally for each new coating oxide-phosphor combination. As shown in FIG. 2, we have established the optimum temperature-time conditions for alumina coated $Zn_2SiO_4$:Mn.

While there has been shown and described what is at present considered the preferred embodiment of the invention, it will be obvious to those skilled in the art that various changes and modifications may be made therein without departing from the scope of the invention as defined by the appended claims.

What is claimed is:

1. A pre-water-based suspension phosphor treatment method comprising the following steps:
   Step 1—annealing a phosphor having a protective oxide coating at about 700° C. to about 850° C. and for a period of about 15 minutes to about 20 hours to preclude adversely affecting said protective oxide coating on said phosphor during subsequent water-based suspension processing and to preclude detrimentally altering said phosphor to form an annealed phosphor;
   Step 2—cooling the annealed phosphor from step 1 to form a cooled annealed phosphor; and
   Step 3—adding the cooled annealed phosphor from step 2 to a water-base suspension.

2. A pre-water-based suspension phosphor treatment method comprising the following steps:
   Step 1—annealing a manganese activated zinc silicate phosphor having a protective oxide coating at about 700° C. to about 850° C. and for a period of about 15 minutes to about 20 hours to preclude adversely affecting said protective oxide coating on said manganese activated zinc silicate phosphor during subsequent water-based suspension processing and to preclude detrimentally altering said manganese activated zinc silicate phosphor to form an annealed phosphor;
   Step 2—cooling the annealed phosphor from step 1 to form a cooled annealed phosphor; and
   Step 3—adding the cooled annealed phosphor from step 2 to a water-based suspension.

3. A pre-water-based suspension phosphor treatment method in accordance with claim 2 wherein said protective oxide coating consists essentially of aluminum oxide.

4. A pre-water-based suspension phosphor treatment method in accordance with claim 2 wherein said annealing comprises a temperature of about 750° C. for a period of about 4 hours.

5. A pre-water-based suspension phosphor treatment method comprising the following steps:
   Step 1—annealing an antimony, manganese activated calcium halophosphate phosphor having a protective oxide coating at about 700° C. to about 850° C. and for a period of about 15 minutes to about 20 hours to preclude adversely affecting said protective oxide coating on said antimony, manganese activated calcium halophosphate phosphor during subsequent water-based suspension processing and to preclude detrimentally altering said antimony, manganese activated calcium halophosphate phosphor to form an annealed phosphor;
   Step 2—cooling the annealed phosphor from step 1 to form a cooled annealed phosphor; and
   Step 3—adding the cooled annealed phosphor from step 2 to a water-based suspension.

6. A pre-water-based suspension phosphor treatment method in accordance with claim 5 wherein said protective oxide coating consists essentially of aluminum oxide 7. A pre-water-based suspension phosphor treatment method in accordance with claim 5 wherein said annealing comprises a temperature of about 750° C. for a period of about 4 hours.

8. A pre-water-based suspension phosphor treatment method in accordance with claim 5 wherein said annealing comprises a temperature of about 850° C. for a period of about one hour.

9. A fluorescent lamp comprising a hermetically sealed tubular glass envelope coated with a phosphor, said phosphor prepared in accordance with claim 1, bases at each end of said tubular glass envelope, electrodes, support electrical leads electrically connected to said electrodes, said electrodes coated with an electron-emission promoting material, and a mercury droplet within said tubular glass envelope.

10. A fluorescent lamp comprising a hermetically sealed tubular glass envelope coated with a phosphor, said phosphor prepared in accordance with claim 2, bases at each end of said tubular glass envelope, electrodes, support electrical leads electrically connected to said electrodes, said electrodes coated with an electron-emission promoting material, and a mercury droplet within said tubular glass envelope.

11. A fluorescent lamp comprising a hermetically sealed tubular glass envelope coated with a phosphor, said phosphor prepared in accordance with claim 5, bases at each end of said tubular glass envelope, electrodes, support electrical leads electrically connected to said electrodes, said electrodes coated with an electron-emission promoting material, and a mercury droplet within said tubular glass envelope.

* * * * *